US012213938B2

(12) United States Patent
Fabian et al.

(10) Patent No.: US 12,213,938 B2
(45) **Date of Patent: *Feb. 4, 2025**

(54) ADJUSTABLE AUTOMATED CPR POSITIONING APPARATUS

(71) Applicants: Ariel Fabian, Paramus, NJ (US); Efraim Schwartz, Paramus, NJ (US)

(72) Inventors: Ariel Fabian, Paramus, NJ (US); Efraim Schwartz, Paramus, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,713

(22) Filed: Aug. 18, 2023

(65) Prior Publication Data

US 2023/0390152 A1 Dec. 7, 2023

Related U.S. Application Data

(63) Continuation of application No. 17/318,862, filed on May 12, 2021, now Pat. No. 11,744,772.

(51) Int. Cl.
*A61H 31/00* (2006.01)

(52) U.S. Cl.
CPC ......... *A61H 31/008* (2013.01); *A61H 31/006* (2013.01); *A61H 2201/1619* (2013.01); *A61H 2201/1623* (2013.01)

(58) Field of Classification Search
CPC .... A61H 31/00; A61H 31/004; A61H 31/005; A61H 31/006; A61H 31/008
See application file for complete search history.

(56) References Cited

U.S. PATENT DOCUMENTS 3,489,140 A 1/1970 Mullikin
3,850,401 A 11/1974 Snediker
4,348,815 A 9/1982 Hurt
(Continued)

FOREIGN PATENT DOCUMENTS

CN 104434493 A 3/2015
CN 204709363 U 10/2015
(Continued)

OTHER PUBLICATIONS

International Search Report for International Application No. PCT/US2022/028713, mailed Jul. 26, 2022.
(Continued)

*Primary Examiner* — Colin W Stuart
*Assistant Examiner* — Christopher E Miller
(74) *Attorney, Agent, or Firm* — PEARL COHEN ZEDEK LATZER BARATZ LLP

(57) ABSTRACT

A cardiopulmonary resuscitation (CPR) positioning apparatus, having a support structure with a plurality of elements, each having a variable length, hingedly connected one to another at respective ends thereof, wherein the support structure is configured to be unfolded from a compactly folded configuration, in which the plurality of elements are arranged one against another, to an operable configuration, in which the elements are arranged end-to-end around a patient's chest; and a CPR chest compressor movably mounted to a first of the plurality of elements, wherein the CPR chest compressor is configured to be moved along the first of the plurality of elements, such that, when the support structure is in the operable configuration, the chest compressor can be positioned precisely above the patient's chest.

20 Claims, 4 Drawing Sheets

(56) References Cited

U.S. PATENT DOCUMENTS

| | | | | |
|---|---|---|---|---|
| 5,257,619 | A | 11/1993 | Everett | |
| 6,290,660 | B1 | 9/2001 | Epps et al. | |
| 6,752,462 | B1 | 6/2004 | Kain | |
| 7,517,325 | B2 | 4/2009 | Halperin | |
| 7,775,996 | B2 | 8/2010 | Stroemsnes | |
| 8,002,720 | B2 | 8/2011 | Hansen et al. | |
| 8,535,251 | B1 | 9/2013 | Rao | |
| 9,016,283 | B2 * | 4/2015 | Paulussen | A61H 31/008 128/870 |
| 9,603,772 | B2 | 3/2017 | Jeppsson et al. | |
| 9,775,771 | B2 | 10/2017 | Stemple et al. | |
| 10,022,295 | B2 | 7/2018 | Wik et al. | |
| 10,292,901 | B2 | 5/2019 | Sebelius et al. | |
| 2007/0102384 | A1 | 5/2007 | Albenda | |
| 2008/0097261 | A1 | 4/2008 | Hansen et al. | |
| 2009/0234255 | A1 | 9/2009 | Votel | |
| 2010/0198118 | A1 | 8/2010 | Itnati | |
| 2012/0238922 | A1 | 9/2012 | Stemple et al. | |
| 2014/0005578 | A1 | 1/2014 | Woerlee et al. | |
| 2015/0313028 | A1 | 10/2015 | Bell et al. | |
| 2015/0359705 | A1 | 12/2015 | Paulussen et al. | |
| 2016/0296419 | A1 | 10/2016 | Paulussen et al. | |
| 2020/0281811 | A1 * | 9/2020 | Kavanagh | A61H 31/02 |

FOREIGN PATENT DOCUMENTS

| | | | |
|---|---|---|---|
| CN | 108403407 | A | 8/2018 |
| EP | 1685820 | B1 | 9/2010 |
| JP | 2012-523883 | A | 10/2012 |
| KR | 101648205 | B1 | 8/2016 |
| KR | 101956053 | B1 | 3/2019 |
| KR | 102299707 | B1 | 9/2021 |
| RU | 198440 | U1 | 7/2020 |
| WO | WO 9200716 | A1 | 1/1992 |
| WO | WO 2002/096343 | A2 | 12/2002 |
| WO | WO 2009/147659 | A1 | 12/2009 |
| WO | WO 2017124135 | A1 | 7/2017 |

OTHER PUBLICATIONS

Supplementary Search Report for European patent application No. 22 808 244.2, dated Sep. 19, 2024.

Notice of Allowance for Korean Patent Application No. 20240019139 A, dated Oct. 14, 2024.

Notice of Allowance for Russian Patent Application No. 2023132363, dated Jul. 1, 2024.

Office Action for Japanese Application No. 2023-569837, dated Mar. 19, 2024.

Office Action for Moroccan Application No. 63058, dated Feb. 15, 2024.

Notice of Granting Patent Right for Invention for Chinese Application No. 202280045402.6, dated Mar. 27, 2024.

* cited by examiner

ADJUSTABLE AUTOMATED CPR POSITIONING APPARATUS

CROSS REFERENCE TO RELATED APPLICATION

This application is a continuation of U.S. patent application Ser. No. 17/318,862, filed May 12, 2021, which is hereby incorporated by reference in its entirety.

FIELD OF THE INVENTION

The invention is related to the field of Cardiopulmonary Resuscitation (CPR) and, more particularly, to an adjustable, portable and non-invasive CPR positioning apparatus.

BACKGROUND OF THE INVENTION

Sudden cardiac arrest is a leading cause of death for men and women, across most racial and ethnic groups in the United States. According to the American Heart Association, adults who suddenly collapse and are not responsive are likely experiencing sudden cardiac arrest, and their chance of survival is nearly zero unless someone else takes action immediately. CPR is a mature technique that has been proven to increase the chances of survivability of patients who have suffered from a cardiac arrest.

When a bystander witnesses an individual having cardiac arrest, that bystander should call 9-1-1 and start pushing hard and fast, with minimal interruption, in the center of the chest of the individual having cardiac arrest. The 2015 American Heart Association CPR guidelines recommended a compression rate of 100-120 per minute at a depth of 2-to-2.4 inches in the center of the victim's chest, enabling full recoil of the chest and minimizing pauses. According to CPR Facts and Stats of the Instructor Network of the American Heart Association (2014 data), nearly 45% of people who experience out-of-hospital cardiac arrest and are treated by bystander CPR survived.

There are many reasons for the failure or ineffectiveness of bystander-performed CPR. Once CPR is initiated by the bystander, the CPR may be ineffective due to improper CPR technique, such as not deep enough compressions, too slow or too fast compressions, inconsistency of CPR administration over an extended time period, and the inability to administer quality CPR during patient transportation. Manually performing CPR on a cardiac arrest victim requires considerable physical effort in order to maintain chest compressions of sufficient depth and rate in the correct location, and can be physically exhausting. Over time, fatigue can set in and compressions can become less regular and less effective, and the failure of CPR can unfortunately result in death or neurological damage to the cardiac arrest victim. In order to overcome this problem, a number of automatic and manual mechanical external chest compression devices for CPR have been developed.

However, even before CPR is initiated, CPR may be delayed or even prevented because the bystander may be unable to properly position the patient on a hard surface and on his/her back, for example, due to the size or weight of the patient, the location of the patient (e.g., trapped in a car) or the surrounding conditions, the potential harm caused to the patient by movement, or the physical condition of the bystander. In addition, even if a mechanical CPR apparatus is available, CPR should be able to be performed quickly. According to the AHA recommendations, and other studies, the recommended period for application of CPR is up to four (4) minutes from the time of cardiac arrest.

As stated by the CPR requirements, the most important factor is the speed of which the patient starts receiving quality CPR. This is when "time is of the essence" and clearly is the differentiator between recovery and major damages up to loss of life. Therefore, any delay in the ability to start the delivery of quality CPR to the patient as fast as possible can lead to devastating results that could have been avoided.

Some of the challenges to use of portable CPR devices are apparatuses that contain multiple parts whose assembly is difficult or require specialized training, the assembly of which wastes valuable time before starting CPR.

Some apparatuses have been developed for positioning an external compression device against the patient's chest to provide a repeated mechanical chest compression. Each of the apparatuses described refers to a support frame that either exists in advance or can be connected to the compression device and can be placed underneath the patient's back to facilitate the chest compression.

For example, U.S. Pat. No. 7,775,996 discloses a resuscitation system having a chest compression device to repeatedly compress the chest of a patient and thereafter allow the chest to expand. The chest compression device is mounted to a transverse plate on a substantially rectangular frame having two lateral legs, with telescoping upper and lower parts, that are hingedly connected between the transverse and a back plate.

U.S. Pat. No. 8,002,720 discloses a chest compression system support having a first embodiment similar to the one shown in U.S. Pat. No. 7,775,996 and a second embodiment in which the two lateral legs, in addition to being hingedly connected between the transverse and a back plate, are hingedly attached between the upper and lower parts.

U.S. Pat. No. 9,603,772 discloses a mechanical CPR apparatus including a back plate, two towers removably attached to the back plate, and a beam releasably connected to each of the two towers, which are together configured to operate in concert to move the beam toward and away from the back plate to provide chest compressions to a patient.

U.S. Pat. No. 10,022,295 discloses a chest compression apparatus having a support structure for holding a chest compressor, with lateral chest supports attached to the support structure at points laterally on either side of the chest when the device is in use, such that the lateral chest supports will apply lateral pressure to the sides of the chest synchronized with compression by the chest compressor However, none of these apparatuses is a lightweight, compactly-folded unit that can be easily transported in a folded condition to the site of the patient's cardiac arrest and then unfolded intuitively on site in a single-mode unfolding motion and threaded expeditiously to wrap around the incapacitated patient's torso in minutes, providing back support for the chest compressions regardless of the position of the patient's body, whether on its side, on its back, or even seated.

In addition, none of those positioning apparatuses, once positioned around the patient's body, can be adjusted to fit closely around the body of the patient, no matter how large or small, and adjusted in all directions so as to position the chest compression device in the best location against the patient's chest for maximum effectiveness, and that provides contrast pressure (i.e., on the opposite side of the body of pressure applied by the chest compression device).

Thus, none of those prior art apparatuses allows the support frame to be built-in and placed against or around the patient in whatever position to facilitate immediate initiation of automated CPR chest compression, through intuitive and self-guided assembly by an untrained operator and without need for instructions or explanations.

There is an urgent need in the art to develop such a positioning apparatus that would allow the chest compression device to be quickly and easily transported to the location of the patient in a compact, folded condition, that can quickly and easily be expanded and arranged around the body of the incapacitated patient, in an intuitive, self-guided manner of assembly without any need for instructions or explanations and without the need to change the position of the patient's body, that can be adjusted to fit around the body of the patient, no matter how large or small, that can be adjusted to position the chest compression device in the best location against the patient's chest for maximum effectiveness, that can provide contrast pressure, and continues to operate hands-free, freeing the operator to call for help or provide assistance to others people in need for help.

SUMMARY OF THE INVENTION

In general, it is an object of the present invention to provide a CPR positioning apparatus that is compactly foldable for easy storing and positioning, lightweight and self-contained and can be conveniently transported in the compact, folded condition.

It is another object of the invention to provide a CPR positioning apparatus that can quickly and easily be expanded and arranged around the body of the incapacitated patient, without the need to change the position of the patient's body.

It is a further object of the invention to provide a CPR positioning apparatus that can be adjusted to fit around the body of the patient, no matter how large or small.

It is yet another object of the invention to provide a CPR positioning apparatus that can be adjusted in all directions to position the chest compression device in the best location against the patient's chest for maximum effectiveness, with constant independent contrast pressure.

These and other objects of the invention are accomplished in some embodiments by an integrated CPR positioning apparatus that is compactly foldable and can be expeditiously unfolded and threaded or wrapped around the patient's body, even by an untrained individual to allow the CPR administration to start with minimum delay and distractions. In some embodiments, the apparatus is designed to provide CPR as first aid and emergency rescue to a person in need anywhere, without the need to change the position of the patient's body, and, once set into place, continues to operate hands-free, freeing the operator to call for help or provide assistance to other people in need for help, or be placed out of danger.

According to some embodiments, the invention is may be implemented by a CPR positioning apparatus having an automated chest compression device, also known as a Power Stroke Delivery Unit (PSDU), which delivers the compression pressure and relief as per the AHA guidelines, mounted on an adjustable frame that allows for continued fine adjustment of compression delivery once the frame is adjusted and set in place around the patient's body. The electromechanically operated and non-invasive automated chest compression device, once positioned against the patient's chest, provides CPR chest compressions to the patient by using a plate that transmits alternatingly chest compression pressure, at the AHA recommended speed and depth, delivering the push-power and release of the pressure. According to some embodiments, the positioning apparatus provides the necessary contrasting pressure (on the opposite side of the compression), regardless of the position or location of the patient's torso.

According to some embodiments, the invention is designed and built as a self-contained, all-inclusive apparatus needed to administer CPR. It is ready for immediate use, with the automated chest compression device already mounted on the frame, eliminating the need for assembly by whoever prepares for the resuscitation, which saves time and prevents confusion, mistakes, or the need for training.

The apparatus has an automated chest compression device attached to a compactly-folded rigid frame that can be adjusted by unfolding the frame in a predefined and intuitive sequence. The only actions required are to lock the frame around the patient, adjust the linearly-telescoping sides, and position the automated chest compression device pressure plate close to the center of the patient's chest, including or excluding the person's arms. There is no need to undress the patient or to create resistance for the chest compressions. Once the frame is adjusted, the position of the automated chest compression device is further adjustable for optimizing CPR delivery to the patient heart and lungs.

Installation speed and ease of use are achieved using a hard, adjustable integrated light folding rectangular frame that is easily configured, constructed, locked, and adjusted around the torso of an incapacitated patient in a matter of seconds and delivers CPR at the optimized location.

In certain embodiments, a cardiopulmonary resuscitation (CPR) positioning apparatus comprises a support structure comprising a plurality of elements, each having a variable length, hingedly connected one to another at respective ends thereof; wherein the support structure is configured to be unfolded from a compactly folded configuration, in which the plurality of elements are arranged one against another, to an operable configuration, in which the elements are arranged end-to-end around a patient's chest; and a CPR chest compressor movably mounted to a first of the plurality of elements, wherein the CPR chest compressor is configured to be moved along the first of the plurality of elements, such that, when the support structure is in the operable configuration, the chest compressor can be positioned precisely above the patient's chest.

In certain embodiments, the plurality of elements comprises four elements, a chest-side element configured to be arranged against the patient's chest when the support structure is in the operable configuration, a back-side element configured to be arranged against the patient's back when the support structure is in the operable configuration, and two side elements configured to be arranged against the patient's sides when the support structure is in the operable configuration and to provide counter resistance to the CPR chest compressor.

In some embodiments, the first of the plurality of elements is the chest-side element. In some embodiments, the CPR chest compressor further comprises a position locking mechanism configured to lock the CPR chest compressor into a position along the length of the chest-side element.

In certain embodiments, each of the plurality of elements comprises two sub-parts that are movable with respect to one another, so as to allow the respective one of the plurality of elements to have a variable length. In some embodiments, the two sub-parts are configured to telescope with respect to one another. In some embodiments, each of the plurality of elements further comprises a length locking mechanism configured to lock the respective two or more sub-parts with respect to one another so as to set the variable length of the respective one of the plurality of elements at a fixed length.

In certain embodiments, an end of each of a first set of two adjacent elements are connected to each other by a hinge, wherein the hinge allows an angle between the first set of two adjacent elements to be varied from substantially 0° to substantially 360°. In some embodiments, the hinge has an angle of substantially 0° or substantially 360° when the support structure is in the compactly folded configuration.

In some embodiments, the hinge has an angle locking mechanism configured to lock the angle between the first set of two adjacent elements when the support structure is in the operable configuration. In some embodiments, the angle locking mechanism is configured to lock the angle between the first set of two adjacent elements at 90°.

In certain embodiments, a connection between an end of each of a second set of two adjacent elements is separable, such that the two elements in the second set of two adjacent elements can be separated from each other, so as to allow the support structure to be threaded around the body of the patient. In some embodiments, the connection between the two elements of the second set of two adjacent elements is a hinge whose angle is variable. In some embodiments, the connection between the two elements of the second set of two adjacent elements is fixed at a predetermined angle, whereby an angle between the two elements of the second set of two adjacent elements does not vary. In some embodiments, the connection between the two elements of the second set of two adjacent elements is re-connectable once separated, so as to allow the support structure to be arranged end-to-end around the patient's chest once it has been threaded around the body of the patient.

In certain embodiments, a method of positioning a cardiopulmonary resuscitation (CPR) device, comprises threading a chain formed of a plurality of elements, each having a variable length and connected one to another at respective ends thereof, around the body of a patient; setting the variable length of each of the respective plurality of elements at a fixed length; connecting an end of each of a first and a second of the plurality of elements to each other, such that the chain of the plurality of elements is arranged end-to-end around the patient's chest as a support structure; setting a fixed angle between each respective connected pair of the respective plurality of elements; and setting a position of a CPR chest compressor along one of the plurality of elements so as to be positioned precisely above the patient's chest.

In some embodiments, the plurality of elements in the support structure comprises four elements: a chest-side element arranged against the patient's chest, a back-side element arranged against the patient's back, and two side elements arranged against the patient's sides. In some embodiments, the step of setting a position of a CPR chest compressor further comprises locking the position of the chest compressor along a length of the chest-side element so as to set the position of the CPR chest compressor.

In certain embodiments, each of the plurality of elements has two or more sub-parts that cooperate to vary the length of the respective one of the plurality of elements, wherein the step of setting the variable length of each of the respective plurality of elements further comprises locking the respective two or more sub-parts of each of the plurality of elements with respect to one another.

In certain embodiments, the plurality of elements in the chain are connected one to another at respective ends thereof by hinges, and the step of setting an angle between each respective connected pair of the respective plurality of elements further comprises locking the hinged connection between each respective connected pair of the respective plurality of elements. In certain embodiments, setting an angle between each respective connected pair of the respective plurality of elements comprises locking the hinges at approximately 90°.

In certain embodiments, the method further comprises unfolded the chain formed of the plurality of elements from a compactly folded configuration, in which the plurality of elements are arranged one against another.

BRIEF DESCRIPTION OF THE DRAWINGS

The principles and operation of the system and method according to the present invention may be better understood with reference to the drawings, and the following description, it being understood that these drawings are given for illustrative purposes only and are not meant to be limiting, wherein.

DETAILED DESCRIPTION OF THE INVENTION

Figure 1:
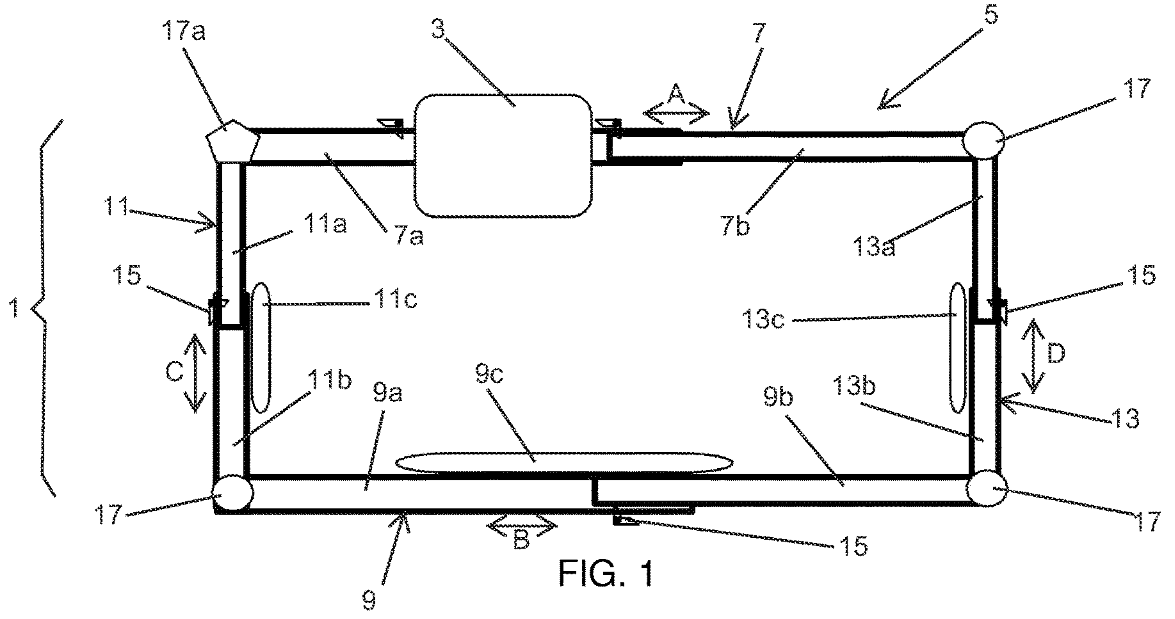
FIG. 1 is a schematic illustration of the apparatus of the present invention in a closed configuration.

Referring now to the drawings, FIG. 1 is a schematic diagram showing a CPR positioning apparatus 1 according to one embodiment of the invention. The apparatus support apparatus 1 includes an automated chest compression device 3, also known as a Power Stroke Delivery Unit (PSDU), which delivers automated and repetitive chest compression pressure to a patient in need, once activated. Automated chest compression device 3 is mounted on an adjustable frame 5. As will be discussed in greater detail hereinbelow, adjustable frame 5 may be brought in a folded condition to the location of a patient in need of CPR, and adjustable frame 5 may then be unfolded and placed around the patient in order to administer the CPR. Adjustable frame 5 is configured to be adjusted around the body of the patient and to allow for fine adjustment of the location of automated chest compression device 3 against the chest of the patient once adjustable frame 5 is adjusted and set in place around the body of the patient.

The adjustable frame 5 comprises a plurality of connected subparts or elements that can be arranged around the body of a patient with a chest compression device mounted to one of the connected elements. In certain embodiments, adjustable frame 5 comprises the fewest number of connected subparts or elements that can be arranged around the body of the patient, e.g., three. In certain other embodiments, adjustable frame 5 comprises as many connected subparts or elements that can be arranged so as to enable adjustable frame 5 to fit closely around the body of the patient, e.g., five, ten, or even more connected subparts or elements. In certain other embodiments, adjustable frame 5 comprises only as many connected subparts or elements that can be arranged so as to form a rectangular frame around the body of the patient, e.g., four. In some embodiments, the plurality of connected subparts or elements comprise a chest side element 7, a back or bottom element 9, a first side element 11 and a second side element 13. A chest compression device 3, the PSDU, may be mounted on chest side element 7, as will be discussed hereinbelow. First and second side elements 11,13 may be coupled to both chest side element 7 and back side element 9, as will be discussed hereinbelow, and may be adapted to provide an adjustable distance between chest side element 7 and back side element 9, in order that frame 5 can be arranged around the body of a patient no matter how large or small the body of that patient is.

In certain embodiments, chest side element 7 is configured to be arranged against the chest side of the patient, so that chest compression device 3 can provide the necessary chest compressions, braced by back side element 9, which is configured to be placed against the back of a patient, in whatever position the patient may be, to provide contrast pressure for the chest compressions. For example, if the patient is supine, i.e., lying on his/her back, back side element 9 is intended to be placed under the back of the patient, such that the upper region of the patient's back is resting on back-side element 9, and chest side element 7 is arranged against the front of the patient, with automated chest compression device 3 directly against the chest. If the patient is prone, i.e., lying on his/her front, chest side element 7 is intended to be placed under the chest of the patient, such that the patient's chest is resting on chest side element 7. In this position, chest side element 7 will rest against the chest of the patient, so that chest compression device 3 can provide the necessary chest compressions against the patient's back. If the patient is lying on his/her side or in a sitting position, back side element 9 is intended to be placed against the back of the patient. In this position, chest side element 7 will rest against the front of the patient, so that automated chest compression device 3 can provide the necessary chest compressions, braced by the back side element 9.

In certain embodiments, one or more, or each, of chest side element 7, back side element 9, first side element 11 and second side element 13 of adjustable frame 5 has multiple subparts that are together adjustable so as to enable the respective element to have a variable and adjustable length. This arrangement permits easy adaptation of the lengths of chest side element 7, back side element 9, first side element 11 and second side element 13 so as to fit around the chest region of the patient.

In one such embodiment, chest side element 7 of adjustable frame 5 has two or more subparts that are together adjustable so as to enable chest side element 7 to have a variable length. In one embodiment, as shown in FIG. 1, chest side element 7 comprises first and second subparts 7*a*,7*b* that are arranged telescopically, assembled either as rails to slide alongside each other or coaxially to telescope one inside the other, in order to permit easy variation of the length of chest side element 7, in the longitudinal directions of as arrows A. For example, in order to lengthen chest side element 7, chest side element subparts 7*a*,7*b* can be pulled apart such that one of subparts 7*a*,7*b* slides out from within the other. In addition, in order to shorten chest side element 7, subparts 7*a*,7*b* can be pushed together such that one of parts 7*a*,7*b* slides into the other. In another embodiment (not shown), chest side element 7 may comprise additional subparts in addition to first and second subparts 7*a*,7*b* that are arranged to telescope one inside the other in order to permit adjustment of the length of chest side element 7, in the longitudinal direction of arrows A.

In preferred embodiments, the adjustment mechanism that allows the two or more subparts of chest side element 7 of adjustable frame 5, such as first and second subparts 7*a*,7*b*, to have a variable length also has a locking mechanism that is configured lock each of the two or more subparts of chest side element 7 into its respective position along the length of chest side element 7 relative to the other subparts. The locking mechanism can be a transverse locking pin 15, as shown in FIG. 1, or any other such locking mechanism as known in the art, such as a clamping device, notched positions, or the like.

Automated chest compression device 3 is mounted to chest side element 7. Automated chest compression device 3 may comprise a chest compression member as is known in the art, including, for example, a piston, a transmission mechanism for transmitting energy to the piston, a motor, and a power supply (not shown). In certain embodiments, automated chest compression device 3 is adjustably mounted to chest side element 7 so as to enable automated chest compression device 3 to move in either direction along the length of chest side element 7, so that automated chest compression device 3 can be arranged in the optimal position against the chest of a patient so as to deliver chest compressions to that patient. The adjustable mechanism that allows automated chest compression device 3 to move in either direction along the length of chest side element 7 can be as known in the art, such as being slidable along a rail. In preferred embodiments, the adjustable mechanism that allows automated chest compression device 3 to move in either direction along the length of chest side element 7 also has a locking mechanism that is configured to lock automated chest compression device 3 in its position along the length of chest side element 7, and the locking mechanism can be as known in the art, such as a transverse locking pin, a clamping device, notches, or the like.

In another such embodiment, back side element 9 of adjustable frame 5 has two or more subparts that are together adjustable so as to enable back side element 9 to have a variable length. In one embodiment, as shown in FIG. 1, back side element 9 comprises first and second subparts 9*a*,9*b* that are arranged to telescope one inside the other, in order to permit easy variation of the length of back side element 9, in the longitudinal direction of arrows B. For example, in order to lengthen back side element 9, back side element subparts 9*a*,9*b* can be pulled apart such that one of subparts 9*a*,9*b* slides out from within the other. In addition, in order to shorten back side element 9, subparts 9*a*,9*b* can be pushed together such that one of subparts 9*a*,9*b* slides into the other. In another embodiment (not shown), back side element 9 may comprise additional subparts in addition to first and second subparts 9*a*,9*b* that are arranged to telescope one inside the other in order to permit adjustment of the length of back side element 9, in the longitudinal direction of arrows B.

In preferred embodiments, the adjustment mechanism that allows the two or more subparts of back side element 9 of adjustable frame 5, such as first and second subparts 9*a*,9*b*, to have a variable length also has a locking mechanism that is configured lock each of the two or more subparts of back side element 9 into its respective position along the length of back side element 9 relative to the other subparts. The locking mechanism can be a transverse locking pin 15, as shown in FIG. 1, or any other such locking mechanism as known in the art, such as a clamping device or the like.

In one embodiment, back side element 9 comprises an optional body support surface 9*c*, at least on a surface facing the inside of closed adjustable frame 5. Body support surface 9*c* can be formed from any material as known in the art, such as foam, padding, or the like, in order to provide comfort for the patient at the same time as providing contrast pressure opposing the pressure supplied by chest compression device 3. Body support surface 9*c* can be mounted on one or more of the subparts of back side element 9, such as subparts 9*a*,9*b*. In some embodiments, body support surface 9*c* has a locking mechanism that is configured to lock body support surface 9*c* in its position against or along the length of back side element 9, and the locking mechanism can be as known in the art, such as a transverse locking pin, a clamping device, notches, or the like.

In a further such embodiment, first side element 11 of adjustable frame 5 has two or more subparts that are together adjustable so as to enable first side element 11 to have a variable length. In one embodiment, as shown in FIG. 1, first side element 11 comprises first and second subparts 11*a*,11*b* that are arranged to telescope one inside the other, in order to permit easy variation of the length of first side element 11, in the longitudinal direction of arrows C. For example, in order to lengthen first side element 11, first side element subparts 11*a*,11*b* can be pulled apart such that one of subparts 11*a*,11*b* slides out from within the other. In addition, in order to shorten first side element 11, subparts 11*a*,11*b* can be pushed together such that one of subparts 11*a*,11*b* slides into the other. In another embodiment (not shown), first side element 11 may comprise additional subparts in addition to first and second subparts 11*a*,11*b* that are arranged to telescope one inside the other in order to permit adjustment of the length of first side element 11, in the longitudinal direction of arrows C.

In preferred embodiments, the adjustment mechanism that allows the two or more subparts of first side element 11 of adjustable frame 5, such as first and second subparts 11*a*, 11*b*, to have a variable length also has a locking mechanism that is configured lock each of the two or more subparts of first side element 11 into its respective position along the length of first side element 11 relative to the other subparts. The locking mechanism can be a transverse locking pin 15, as shown in FIG. 1, or any other such locking mechanism as known in the art, such as a clamping device or the like.

First side element 11 may comprise a body support surface 11*c*, at least on a surface facing the inside of closed adjustable frame 5. Body support surface 11*c* can be formed from any material as known in the art, such as foam, padding, or the like, in order to provide comfort for the patient when adjustable frame 5 is arranged around the body of the patient. Body support surface 11*c* can be mounted on one or more of the first side element subparts, such as subparts 11*a*,11*b*. In some embodiments, body support surface 11*c* has a locking mechanism that is configured to lock body support surface 11*c* in its position against or along the length of first side element 11, and the locking mechanism can be as known in the art, such as a transverse locking pin, a clamping device, notches, or the like.

In a further such embodiment, second side element 13 of adjustable frame 5 has two or more subparts that are together adjustable so as to enable second side element 13 to have a variable length. In one embodiment, as shown in FIG. 1, second side element 13 comprises first and second subparts 13*a*,13*b* that are arranged to telescope one inside the other, in order to permit easy variation of the length of second side element 13, in the longitudinal direction of arrows D. For example, in order to lengthen second side element 13, second side element subparts 13*a*,13*b* can be pulled apart such that one of subparts 13*a*,13*b* slides out from within the other. In addition, in order to shorten second side element 13, subparts 13*a*,13*b* can be pushed together such that one of subparts 13*a*,13*b* slides into the other. In another embodiment (not shown), second side element 13 may comprise additional subparts in addition to first and second subparts 13*a*,13*b* that are arranged to telescope one inside the other in order to permit adjustment of the length of second side element 13, in the longitudinal direction of arrows D.

In preferred embodiments, the adjustment mechanism that allows the two or more subparts of second side element 13 of adjustable frame 5, such as first and second subparts 13*a*,13*b*, to have a variable length also has a locking mechanism that is configured lock each of the two or more subparts of second side element 13 into its respective position along the length of second side element 13 relative to the other subparts. The locking mechanism can be a transverse locking pin 15, as shown in FIG. 1, or any other such locking mechanism as known in the art, such as a clamping device or the like.

Second side element 13 may comprise a body support surface 13*c*, at least on a surface facing the inside of closed adjustable frame 5. Body support surface 13*c* can be formed from any material as known in the art, such as foam, padding, or the like, in order to provide comfort for the patient when adjustable frame 5 is arranged around the body of the patient. Body support surface 13*c* can be mounted on one or more of the second side element subparts, such as subparts 13*a*,13*b*. In some embodiments, body support surface 13*c* has a locking mechanism that is configured to lock body support surface 13*c* in its position against or along the length of second side element 13, and the locking mechanism can be as known in the art, such as a transverse locking pin, a clamping device, notches, or the like.

As shown in FIG. 1, one or more of chest side element 7, back side element 9, first side element 11 and second side element 13 of adjustable frame 5 may be straight or substantially straight. In certain embodiments, all of chest side element 7, back side element 9, first side element 11 and second side element 13 of adjustable frame 5 are straight or substantially straight. In these embodiments, as shown in FIG. 1, the respective subparts of each of chest side element 7, back side element 9, first side element 11 and second side element 13 allows the respective element to have a variation of its length along the straight or substantially straight longitudinal direction of the respective element.

In certain other embodiments, however, one or more of chest side element 7, back side element 9, first side element 11 and second side element 13 of adjustable frame 5 may be not straight, and may have, for example, a curved or arcuate configuration. In certain embodiments, all of chest side element 7, back side element 9, first side element 11 and second side element 13 of adjustable frame 5 are not straight, and may have, for example, a curved or arcuate configuration. In these embodiments, as shown in FIG. 1, the respective subparts of each of chest side element 7, back side element 9, first side element 11 and second side element 13 allows the respective element to have a variation of its length along the curved or acuate longitudinal direction of the respective element.

As shown in FIG. 1, the respective ends of each of first side element 11 and second side element 13 of adjustable frame 5 are connected to the respective ends of chest side element 7 and back side element 9. In certain embodiments, the connections between the ends of first side element 11 and the respective ends of chest side element 7 and back side element 9 are rotatable, and the connections between the ends of second side element 13 and the respective ends of chest side element 7 and back side element 9 are rotatable.

Specifically, as shown in FIG. 1, the distal end of subpart 11*a* of first side element 11 is rotatably connected to the distal end of subpart 7*a* of chest side element 7, and the distal end of subpart 11*b* of first side element 11 is rotatably connected to the distal end of subpart 9*a* of back side element 9. Similarly, the distal end of subpart 13*a* of second side element 13 is rotatably connected to the distal end of subpart 7*b* of chest side element 7, and the distal end of subpart 13*b* of second side element 13 is rotatably connected to the distal end of subpart 9*b* of back side element 9.

In certain embodiments, the rotatable connections of adjustable frame 5 use hinges 17. The term "hinges" as used herein refers to any element that permits at least rotational connection between two parts. Hinges 17 can also be a flexure hinges, so as to permit slidable connection or some linear displacement of the connected elements in addition to rotational connection therebetween, as will be necessary when adjustable frame 5 is folded/unfolded, as discussed hereinbelow.

In certain embodiments, at least one of hinges 17 also has a locking mechanism (not shown) that is configured to lock hinge 17 into its respective position once the respective parts/subparts of adjustable frame 5 have been set relative to the other parts/subparts. In certain embodiments, each of hinges 17 has such a locking mechanism. The locking mechanism can be a transverse locking pin, a clamping device, notches, or any other such locking mechanism as known in the art.

In some embodiments, the locking mechanisms of hinges 17 can lock the respective elements joined by hinges 17 into whatever angles are selected, once the elements of adjustable frame 5 are arranged around the body of the patient. Thus, in the embodiments in which adjustable frame 5 has four elements, such as chest side element 7, back side element 9, first side element 11 and second side element 13 that are all straight or substantially straight, adjustable frame 5 will have a rectangular or square configuration once the locking mechanism of hinges 17 has locked the respective elements joined by hinges into approximately 90° angles. In other embodiments, the locking mechanism of hinges 17 can lock the respective elements joined by hinges into a variety of angles, once the adjustable frame 5 is arranged around the body of the patient. In certain other embodiments, the variety of angles of hinges 17 may be any angles that add up to 360° once the adjustable frame 5 is arranged around the body of the patient.

In certain embodiments, at least one of hinges 17, e.g., hinge 17*a*, is not rotatable at all (and thus, in such an embodiment, should be called joint 17*a* rather than hinge 17*a*) and instead is configured such that the respective elements/subparts of adjustable frame 5 that are to be connected by hinge/joint 17*a* are arranged at a specific angle once so connected with hinge/joint 17*a*. In certain embodiments, each of the other hinges 17 may have a locking mechanism, such as a transverse locking pin, a clamping device, notches, or any other such locking mechanism as known in the art, that enables the respective other elements joined by hinges 17 into whatever angles are selected, once the elements of adjustable frame 5 are arranged around the body of the patient. In this embodiment, once the elements/subparts of adjustable frame in an open position are arranged around the body of the patient, the remote elements/subparts of adjustable frame 5 are connected by hinge/joint 17*a* and set into the specific, pre-determined angle of hinge/joint 17*a*, and then the other elements of adjustable frame 5 are set into position by locking hinges 17 into whatever respective angles are selected.

While FIG. 1 shows the distal end of subpart 11*a* of first side element 11 being connected to the distal end of subpart 7*a* of chest side element 7 by way of hinge/joint 17*a* and shows all other elements of adjustable frame 5 being connected by hinges 17, in another embodiment, any other two of the elements of adjustable frame 5 can be connected by way of hinge/joint 17*a*, with the rest being connected by hinges 17.

Figure 2:
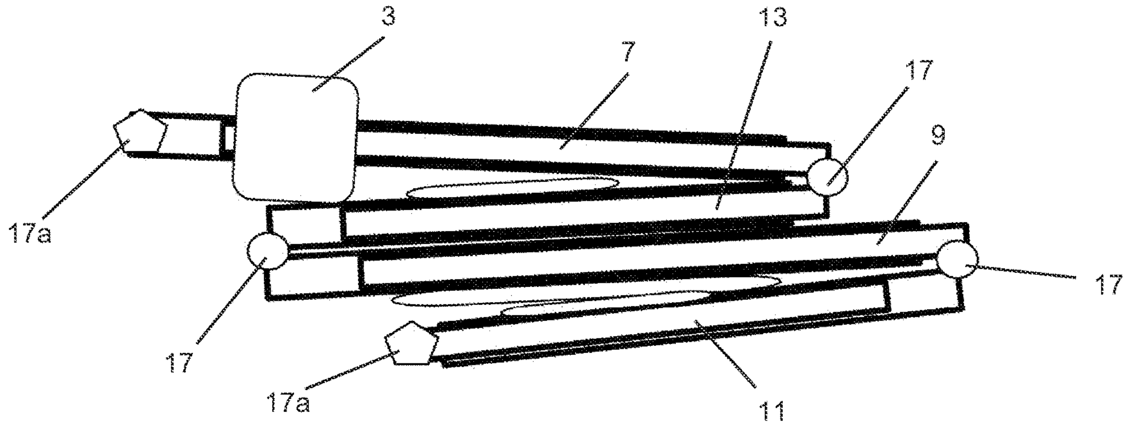
FIG. 2 is a schematic illustration of the apparatus of the present invention in a fully folded configuration.

CPR positioning apparatus 1 can be changed from the operative configuration of FIG. 1 and made more compact, e.g., for transport, by folding it into a flattened configuration, as shown in FIG. 2. In one such configuration, hinges 17 allow the respective elements joined thereby to rotate from an angle that is virtually 0° to an angle that is virtually 360°.

In one embodiment of a flattened configuration, two of hinges 17 within adjustable frame are flexed completely so that the respective elements connected thereby lie one against another, i.e., at an angle that is virtually 0°, while the other two hinges 17 within adjustable frame 5 are unflexed completely, i.e., at an angle that is virtually 360°, so that the respective elements connected thereby are linearly arranged in axial alignment with one another. For example, the hinge 17 between chest side element 7 and first side element 11 is flexed completely, and the hinge 17 between back side element 9 and second side element 13 is flexed completely, while the hinge 17 between chest side element 7 and second side element 13 is unflexed completely so that those elements are linearly arranged, and the hinge 17 between first side element 11 and back side element 9 is unflexed completely so that those elements are linearly arranged. In another example, the first two hinges referred to above can be unflexed completely, while the second two hinges referred to above can be flexed completely.

In an embodiment wherein hinges 17 are standard hinges, adjustable frame 5 in this flattened configuration resembles a very narrow parallelogram, because hinges 17 can reach only very small angles without the respective elements being physically able to be made to lie against one another. However, in certain embodiments, in order to allow elements 7, 9, 11 and 13 of adjustable frame 5 to be folded flat against one another, i.e., at an angle that is either 0° or 360°, rather than at a very small angle relative to each other, each of hinges 17 can be a flexure hinge, i.e., a hinge that permits some slidable movement or linear displacement of the elements connected by hinge 17, as is well known in the art. This allows elements 7, 9, 11 and 13 of adjustable frame to be folded flat, i.e., in parallel, against each other when hinges 17 are flexed completely. Thus, in an embodiment wherein hinges 17 are flexure hinges, adjustable frame 5 in this flattened configuration resembles a straight line, wherein chest side element 7 and second side element 13 are linearly aligned and lie flat against linearly aligned first side element 11 and back side element 9, or wherein chest side element 7 and first side element 11 are linearly aligned and lie flat against linearly aligned back side element 9 and second side element 13.

In another embodiment of a flattened configuration, all of hinges 17 within adjustable frame 5 are flexed completely so that all the respective elements connected thereby lie one against another, i.e., at an angle that is either 0° or 360°, with no respective elements being linearly arranged in axial alignment with one another. However, in this embodiment, in order to allow adjustable frame 5 to be folded more into this compact configuration, at least one of hinges 17, and in certain embodiments only one of hinges 17, is separable and allows the two elements that are rotatably connected to each other to be completely disconnected. Once the separable one of hinges 17 is disconnected, chest side element 7, back side element 9, first side element 11 and second side element 13 of adjustable frame 5 can be folded one over another for compact movement, such as shown in FIG. 2.

For example, as shown in FIG. 1, the hinge/joint 17*a* that connects first side element 11 to chest side element 7 can be separated, so as to allow first side element 11 to be completely broken away from chest side element 7. In the embodiment wherein each of first side element 11 to chest side element 7 has extendable subparts, the hinge/joint 17*a* that connects the distal end of subpart 11*a* of first side element 11 to the distal end of subpart 7*a* of chest side element 7 can be separated, so as to allow the distal end of subpart 11*a* of first side element 11 to be completely broken away from the distal end of subpart 7*a* of chest side element 7. Alternatively, while the description herein treats hinge/joint 17*a* as separably connecting the distal end of subpart 11*a* of first side element 11 and the distal end of subpart 7*a* of chest side element 7, any other of hinges 17 may be equally configured so as to be separable.

FIG. 2 is a schematic illustration of the CPR positioning apparatus 1 in a compactly folded configuration, illustrating the packed/stored structure. FIG. 2 demonstrates one of many folding options.

When in the compactly folded configuration shown in FIG. 2, CPR positioning apparatus 1 can be conveniently stored and transported, so as to occupy a minimum amount of space. When needed, the folded CPR positioning apparatus 1 can be quickly retrieved from its storage location and easily transported to the site of an injured patient in need of CPR. Then, the folded CPR positioning apparatus 1 can easily be constructed around an incapacitated patient, regardless of the patient's body position. The actual construction, adjustment and administration can be intuitively done by an untrained person quickly and without any specialized equipment so as to enable CPR to be started immediately.

Figure 3:
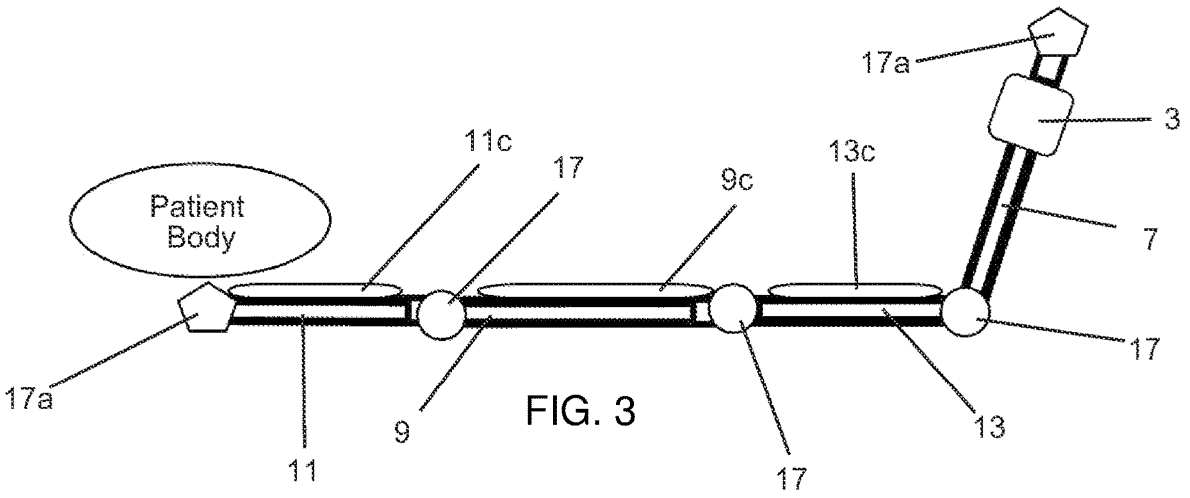
FIG. 3 is a schematic illustration of the apparatus of the present invention in an open, unfolded configuration, ready to be placed under the back of the patient.

From the flattened configuration shown in FIG. 2, CPR positioning apparatus 1 can easily be changed into the operative configuration shown in FIG. 1. In certain embodiments, in order to convert CPR positioning apparatus 1 from its compactly folded configuration shown in FIG. 2 into an operable configuration, such as shown in FIG. 1, elements 7, 9, 11 and 13 of adjustable frame 5 are first unfolded from their compactly folded configuration shown in FIG. 2, into a completely open configuration, such as shown in FIG. 3. Doing so requires unflexing hinges 17 between the connected elements 7, 9, 11 and 13 of adjustable frame 5. In certain embodiments, FIGS. 3 and 4 illustrate the stages transforming adjustable frame 5 from a folded configuration shown in FIG. 2 into the operable configuration shown in FIG. 1.

In certain embodiments, all of elements 7, 9, 11 and 13 of adjustable frame 5 are unfolded so that they are linearly arranged. In certain other embodiments, only first side element 11, back side element 9 and second side element 13 of adjustable frame 5 need be unfolded so that they are linearly arranged, and chest side element 7 can still be folded relative to second side element 13, as shown in FIG. 3. In certain other embodiments, only first side element 11 and back side element 9 of adjustable frame 5 need be unfolded so that they are linearly arranged, and second side element 13 and chest side element 7 can still be folded relative to second side element 13 or relative to each other.

Regardless of which of elements 7, 9, 11 and 13 of adjustable frame 5 are unfolded, using hinges 17, so that they are linearly arranged, unfolded adjustable frame 5 is ready to slide underneath the patient's back or being placed across the supine patient's back, as shown in FIG. 3, and then back side element 9 of adjustable frame 5 must be arranged so as to be against the back of the patient. For example, for a patient lying supine, i.e., on the patient's back, first side element 11 and back side element 9 of adjustable frame 5 should be threaded under the back of the patient, and first side element 11 is pulled past the back of the patient so that back side element 9 of adjustable frame 5 is arranged under the back of the patient. In certain embodiments, hinges 17 between elements 7, 9, 11 and 13 are capable of being flexed at angles larger than 180°. This is useful when threading first side element 11 and back side element 9 of adjustable frame 5 under the back of the patient, in order to provide for situations in which the supine patient is not resting on flat ground.

Figure 4:
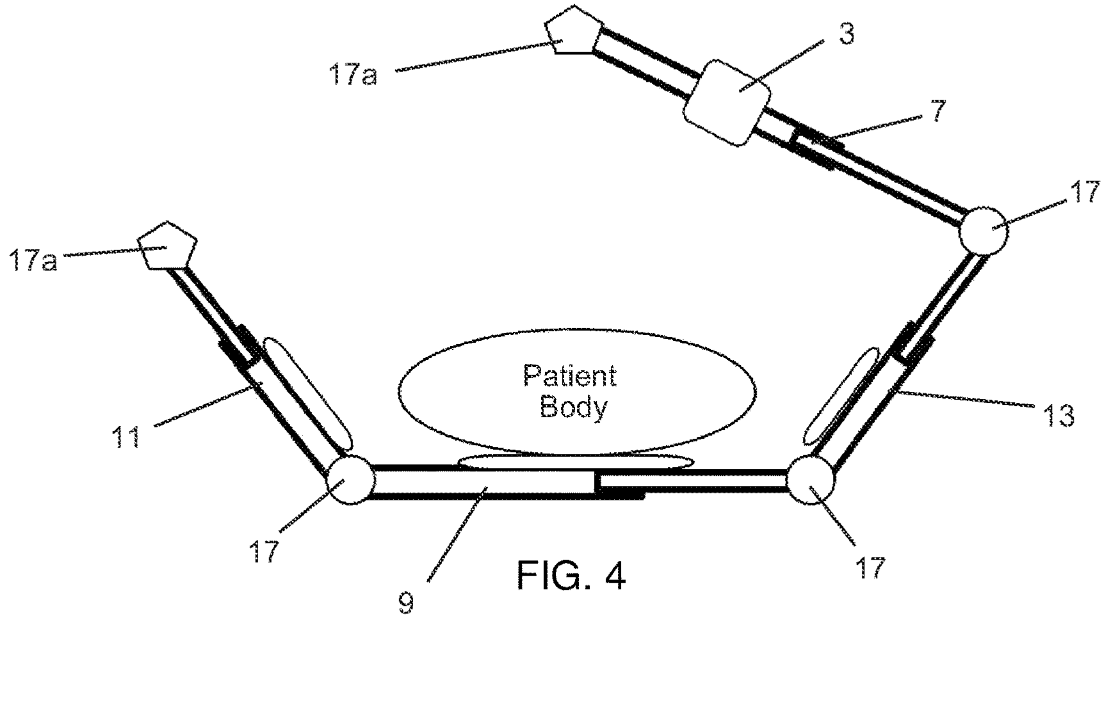
FIG. 4 is a schematic illustration of the apparatus of the present invention in a partially closed, unfolded configuration in the process of being arranged around the body of a patient.

As shown in FIG. 4, once the patient is resting directly on back side element 9 of adjustable frame 5, for example on body support surface 9*c*, first side element 11, second side element 13 and chest side element 7 of adjustable frame 5 can be folded around the body of the patient. Then, in certain embodiments, chest side element 7 can be locked to first side element 11, using, e.g., at least one lockable hinge/joint, such as hinge/joint 17*a*, either having a locking mechanism or being configured such that the connected elements are set at a specific angle, both as discussed hereinabove. Further locking some or all of hinges 17 at specific angles provides rigidity to adjustable frame 5 in its operable configuration, and allows a consistent compression treatment regardless of the substrate or the patient's body positioning.

Various hinged locking mechanisms can be used, and the choice of one mechanism or another depends on the model of adjustable frame 5. In one basic version, the locking mechanism is made by manually rolling the lock tongue into place. In advanced models, for added simplicity, the hinge may be locked automatically by a pressure ball, or spring loaded a pin that will go into a pre-designed hole. Some examples of known locking mechanisms that may be suitable are a ball catch latch, a jamb pocket latch bolt assembly release apparatus, a cabinet ball door catch, a pressure release slide latch mechanism, a spring-loaded sliding bolt latch, a locking pull pin latch, a quick-release ball lock pin, an adjustable locking hinge, a self-adjusting compression latch spring, a weld-on spring latch, and a leaf spring assisted opener spring latch (such as a switch-blade knife locking mechanism).

In certain embodiments, each of chest side element 7, back side element 9, first side element 11 and second side element 13 of adjustable frame 5 may be adjusted for length, as discussed hereinabove, either before or after adjustable frame 5 is closed and locked around the body of the patient, so that adjustable frame 5 fits closely around the body of the patient.

Specifically, the length of each of chest side element 7, back side element 9, first side element 11 and second side element 13 of adjustable frame 5 is adjusted so that the height and width of adjustable frame 5, when folded around the body of the patient, fits closely around that patient body. These adjustments are made based on the size and shape of the patient's body. In certain embodiments, first side element 11 and second side element 13 of adjustable frame 5 are adjusted so that support surfaces 11*c*,13*c* contact the respective sides of the patient's body. For example, once adjustable frame 5 has been arranged around the patient body, the width and height adjustments may be made easily, and the lengths of the respective elements 7, 9, 11 and 13 of adjustable frame 5 may be locked into position, while ensuring that each respective element is making contact with the patient body.

Figure 5A:
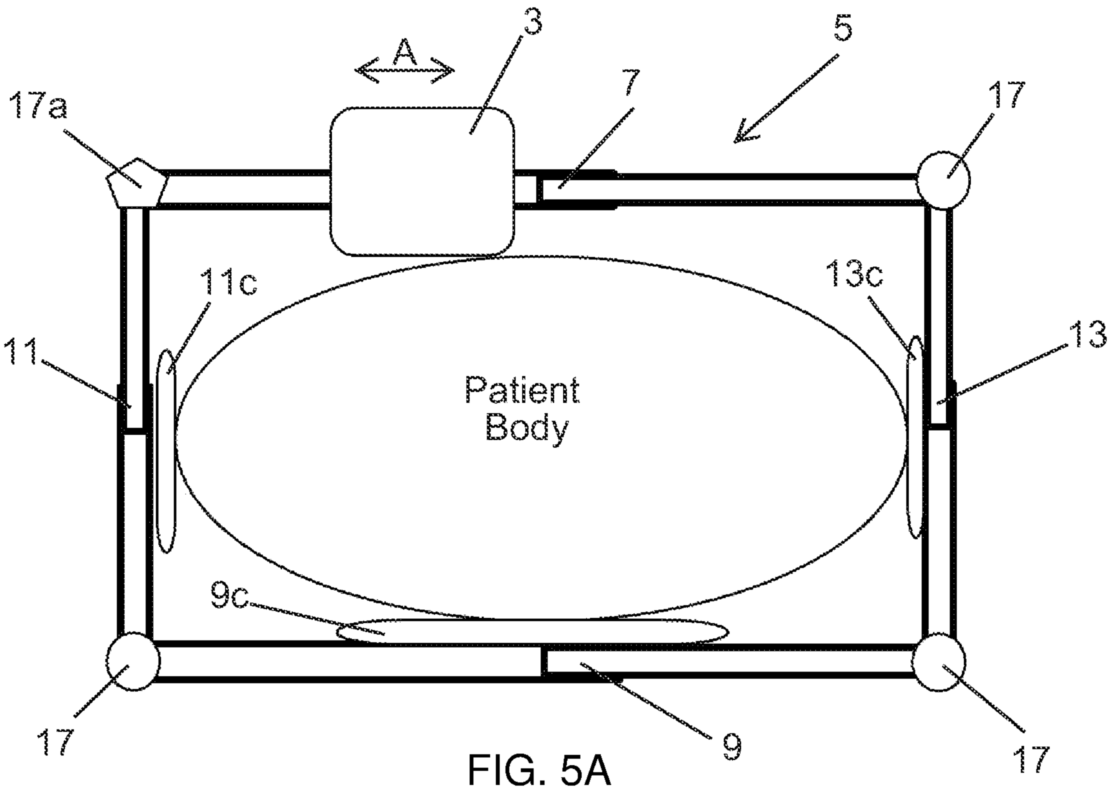
FIG. 5A is a schematic illustration of the apparatus of the present invention in a closed configuration arranged around the body of a patient.
Figure 5B:
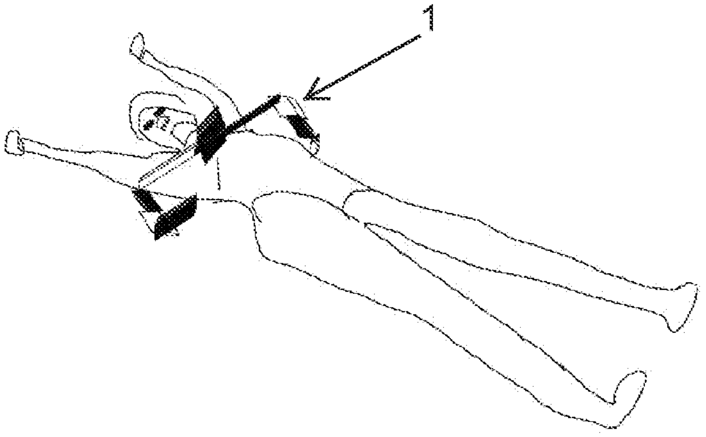
FIG. 5B is an illustration of the apparatus of the present invention in a closed configuration arranged around the body of a supine patient.

FIG. 5A shows CPR positioning apparatus 1 is in an operable configuration, wherein adjustable frame 5 is folded around the body of the patient. FIG. 5B shows CPR positioning apparatus 1 in the operable configuration arranged around the body of a supine patient. In this embodiment, hinge/joint 17*a* has been reconnected/locked together and either folded into the planned 90° angle or set into the predetermined 90° angle, and hinges 17 have been folded into angles. In certain embodiments, hinge/joint 17*a* may be locked/connected into approximately a 90° angle. In certain embodiments, hinge/joint 17*a* and hinges 17 may be locked into approximately 90° angles. In certain embodiments, hinges 17 may be configured to be locked into angles 90°+/−10-20°. In certain embodiments, hinges 17 may be configured to block angles over 90°. In other embodiments, each of hinges 17 may be folded, as well as locked, if desired, into whatever angle allows adjustable frame 5 to fit best around the body of the patient. In certain embodiments, hinges 17 may be locked into position, with each respective element in contact with the patient's body.

In further embodiments, in order to achieve a precise positioning of the pressure plate of the chest compression device 3 against the patient's chest on or near the patient's heart, the chest compression device 3 can be adjusted along the length of chest side element 7, as discussed hereinabove, in the longitudinal directions of as arrows A. In certain embodiments, chest compression device 3 can be locked into position, for example with locking mechanism 15, such that adjustable frame 5 is stable to withstand the compression power.

In certain embodiments, each of chest side element 7, back side element 9, first side element 11 and second side element 13 of adjustable frame 5 makes contact with the patient body, either directly or through respective support surfaces 9*c*, 11*c* and 13*c*. Thus, when chest compression device 3 is delivering compressions to the patient chest, the patient's body is locked within the closed structure of CPR positioning apparatus 1 in a manner that does not allow any relative movement of the frame 5 itself, while at the same time allowing CPR positioning apparatus 1 to provide compression/relief sequence against back support surface 9*c* that is fixed in place by the rigidity of the locked, adjusted sides and locked hinges 17.

Figure 6:
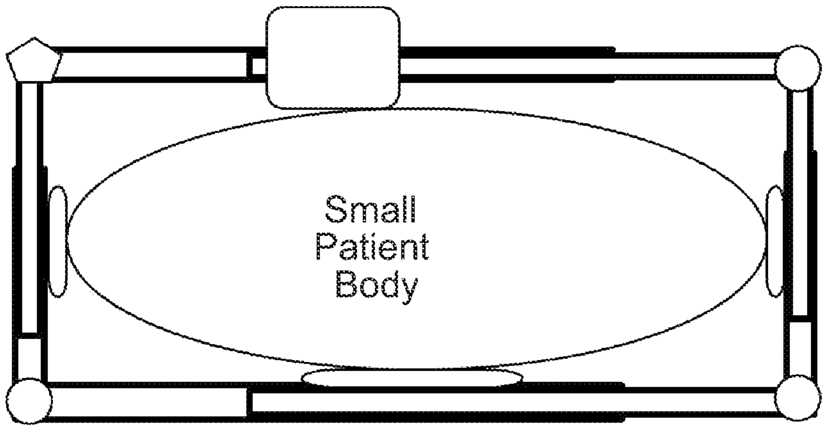
FIG. 6 is a schematic illustration of the apparatus of the present invention in a closed configuration arranged around the body of a small patient.
Figure 7:
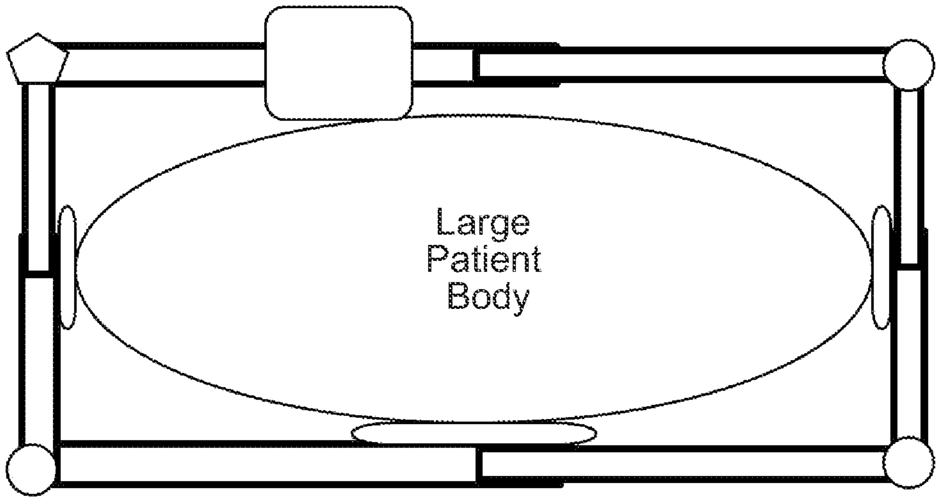
FIG. 7 is a schematic illustration of the apparatus of the present invention in a closed configuration arranged around the body of a large patient.

FIGS. 6 and 7 show a tight fit of different size patient bodies within the closed frame 5 of CPR positioning apparatus 1. Specifically, FIG. 6 shows CPR positioning apparatus 1 is in an operable configuration wherein adjustable frame 5 is folded around the small body of a patient, and FIG. 7 shows CPR positioning apparatus 1 is in an operable configuration wherein adjustable frame 5 is folded around the large body of a patient.

In certain body positions and in situations where there is a need to evacuate or transfer the patient to another location, CPR positioning apparatus 1 can also include securing straps and head restraints (not shown), to allow operation of the CPR positioning apparatus to provide CPR even in a situation where external conditions would normally prevent administration of CPR by other means.

It should be noted that CPR positioning apparatus 1 can be arranged around the body of a patient regardless of the patient's position, whether lying on the back (i.e., supine) on a hard surface, as discussed above, lying on the stomach (i.e., prone), lying on the side, or sitting, e.g., sitting and trapped in a car. CPR positioning apparatus 1 can be constructed and locked around the body, either with one or both arms inside or outside the frame, and then chest compressions adhering to AHA guidelines can be administered.

Furthermore, in certain embodiments, optional straps and head restraints are provided to permit the patient to be moved and transferred while still receiving quality CPR until medical assistance personal take over. In vertical body positions and unstable circumstances, such as when the patient is being evacuated to another location, using the Safety Straps will ensure that adjustable frame 5 will not move relative to the patient's body, for example, by mounting one or more straps from the chest side element 7 over the patient's shoulders to the back side element 9, or around the chest, from first side element 11 to second side element 13, or any other way.

In order to change the CPR positioning apparatus 1 from the operable configuration shown in FIG. 1 to the folded configuration shown in FIG. 2, separable hinge/joint 17*a* should be disconnected such that the distal end of subpart 11*a* of first side element 11 is separated from the distal end of subpart 7*a* of chest side element 7 (or whichever two subparts of frame 5 are connected by hinge/joint 17*a* are separated from each other), and then elements 7, 9, 11 and 13 of adjustable frame 5 are folded over one another. In certain embodiments, each of chest side element 7, back side element 9, first side element 11 and second side element 13 of adjustable frame 5 is shortened to the greatest extent possible, either before disconnection of hinge/joint 17*a* or afterwards, and either before folding of hinges 17 or afterwards.

Thus, a CPR positioning apparatus has been provided. One skilled in the art will appreciate that the present invention can be practiced by other than the described embodiments, which are presented for purposes of illustration and not limitation, and that the invention is limited only by the claims that follow. Further, since numerous modifications and changes will readily occur to those skilled in the art, it is not desired to limit the invention to the exact construction and operation shown and described, and accordingly, all suitable modifications and equivalents may be resorted to, without departing from the scope or spirit of the invention as defined in the appended claims.

The invention claimed is:

1. An apparatus for selectively positioning a cardiopulmonary resuscitation (CPR) chest compressor, comprising:

a support structure comprising a plurality of elements, each element having a variable length, and said plurality of elements being connected one to another at respective ends thereof in the form of a chain;

wherein the respective ends of each set of two adjacent elements are connected to each other by a hinge;

wherein the support structure is configured to selectively have a compact configuration, in which the plurality of elements are folded and arranged one against another, and an operable configuration, in which the plurality of elements are unfolded and arranged end-to-end completely around a patient's torso;

wherein an unconnected end of each of two most remote elements of the support structure may be selectively connected to each other by a connectable hinge, whereby the connectable hinge allows the unconnected ends of the two most remote elements to be selectively connected to each other to lock the support structure in the operable configuration; and wherein a first of the plurality of elements is configured to allow a CPR chest compressor to be movably mounted thereto and to be moved therealong, such that, when the support structure is in the operable configuration, the chest compressor can be positioned precisely above the patient's chest.

2. The apparatus for positioning a CPR chest compressor according to claim 1, wherein the plurality of elements comprises:

a chest-side element configured to be arranged against the patient's chest when the support structure is in the operable configuration, a back-side element configured to be arranged against the patient's back when the support structure is in the operable configuration and to provide counter resistance to the CPR chest compressor, and two side elements configured to be arranged against the patient's sides when the support structure is in the operable configuration.

3. The apparatus according to claim 2, wherein the first of the plurality of elements is the chest-side element.

4. The apparatus according to claim 1, wherein the first of the plurality of elements is further configured to allow the CPR chest compressor to be locked into a position along the length thereof.

5. The apparatus according to claim 1, wherein each element comprises two sub-parts that are movable with respect to one another, so as to allow said at least one element to have a variable length.

6. The apparatus according to claim 5, wherein the two sub-parts are configured to telescope with respect to one another.

7. The apparatus according to claim 5, wherein said at least one element further comprises a length locking mechanism configured to selectively lock the respective two sub-parts with respect to one another, so as to set the variable length of said at least one element at a selected fixed length.

8. The apparatus according to claim 1, wherein each hinge connecting the respective ends of each set of two adjacent elements allows an angle between the respective two adjacent elements to be selectively varied from substantially 0° to substantially 360°.

9. The apparatus according to claim 8, wherein the angle between the respective two adjacent elements is substantially 0° or substantially 360° when the support structure is folded in the compact configuration.

10. The apparatus according to claim 1, wherein each hinge connecting the respective ends of each set of two adjacent elements has an angle locking mechanism configured to selectively lock an angle between the respective two adjacent elements when the support structure is in the operable configuration.

11. The apparatus according to claim 10, wherein the angle locking mechanism of each hinge connecting the ends of each set of two adjacent elements is configured to lock the angle between the respective two adjacent elements at approximately 90° when the support structure is in the operable configuration.

12. The apparatus according to claim 1, wherein the connectable hinge between the two most remote elements is selectively disengageable, such that, once connected to lock the support structure in the operable configuration, the two most remote elements can be separated from each other, so as to allow the support structure to be unlocked from the operable configuration and folded into the compact configuration.

13. The apparatus according to claim 12, wherein the connectable hinge between the two most remote elements is re-connectable once disengaged, so as to allow the support structure to be unfolded into the operable configuration once it has been folded into the compact configuration.

14. The apparatus according to claim 1, wherein the connectable hinge connecting the two most remote elements has an angle locking mechanism configured to lock an angle between the two most remote elements.

15. The apparatus according to claim 14, wherein the angle locking mechanism of the connectable hinge connecting the two most remote elements is configured to lock the angle between the two most remote elements at approximately 90° when the support structure is in the operable configuration.

16. An apparatus for selectively positioning a therapeutic device against a patient's body part, comprising:

a support structure comprising a plurality of elements, each such element having a telescopic variable length, and said plurality of elements being connected one to another at respective ends thereof in the form of a chain;

wherein the respective ends of each set of two adjacent elements are connected to each other by a hinge; and wherein the support structure is configured to selectively have a compact configuration, in which the plurality of elements are folded and arranged one against another, and an operable configuration, in which the plurality of elements are unfolded and arranged end-to-end completely around a body part of the patient;

wherein an unconnected end of each of two most remote elements of the support structure may be selectively connected to each other by a connectable hinge, whereby the connectable hinge allows the unconnected ends of the two most remote elements to be selectively connected to each other to lock the support structure in the operable configuration; and wherein a first of the plurality of elements is configured to allow a therapeutic device to be movably mounted thereto and to be moved therealong, such that, when the support structure is in the operable configuration, the therapeutic device can be positioned precisely in a desired position against the patient's body part.

17. The apparatus according to claim 16, wherein an angle between the respective elements of each set of two adjacent elements is substantially 0° or substantially 360° when the support structure is folded in the compact configuration.

18. The apparatus according to claim 16, wherein each hinge connecting the respective ends of each set of two adjacent elements has an angle locking mechanism configured to selectively lock an angle between the respective two adjacent elements.

19. The apparatus according to claim 16, wherein the connectable hinge between the two most remote elements is selectively disengageable, such that, once connected to lock the support structure in the operable configuration, the two most remote elements can be separated from each other, so as to allow the support structure to be unlocked from the operable configuration and to be folded into the compact configuration, and wherein the connectable hinge between the two most remote elements is re-connectable once disengaged, so as to allow the support structure to be unfolded into the operable configuration once it has been folded into the compact configuration.

20. The apparatus according to claim 16, wherein the therapeutic device is a cardiopulmonary resuscitation (CPR) positioning apparatus, and wherein the patient's body part is the patient's chest.

* * * * *